Figure 1:
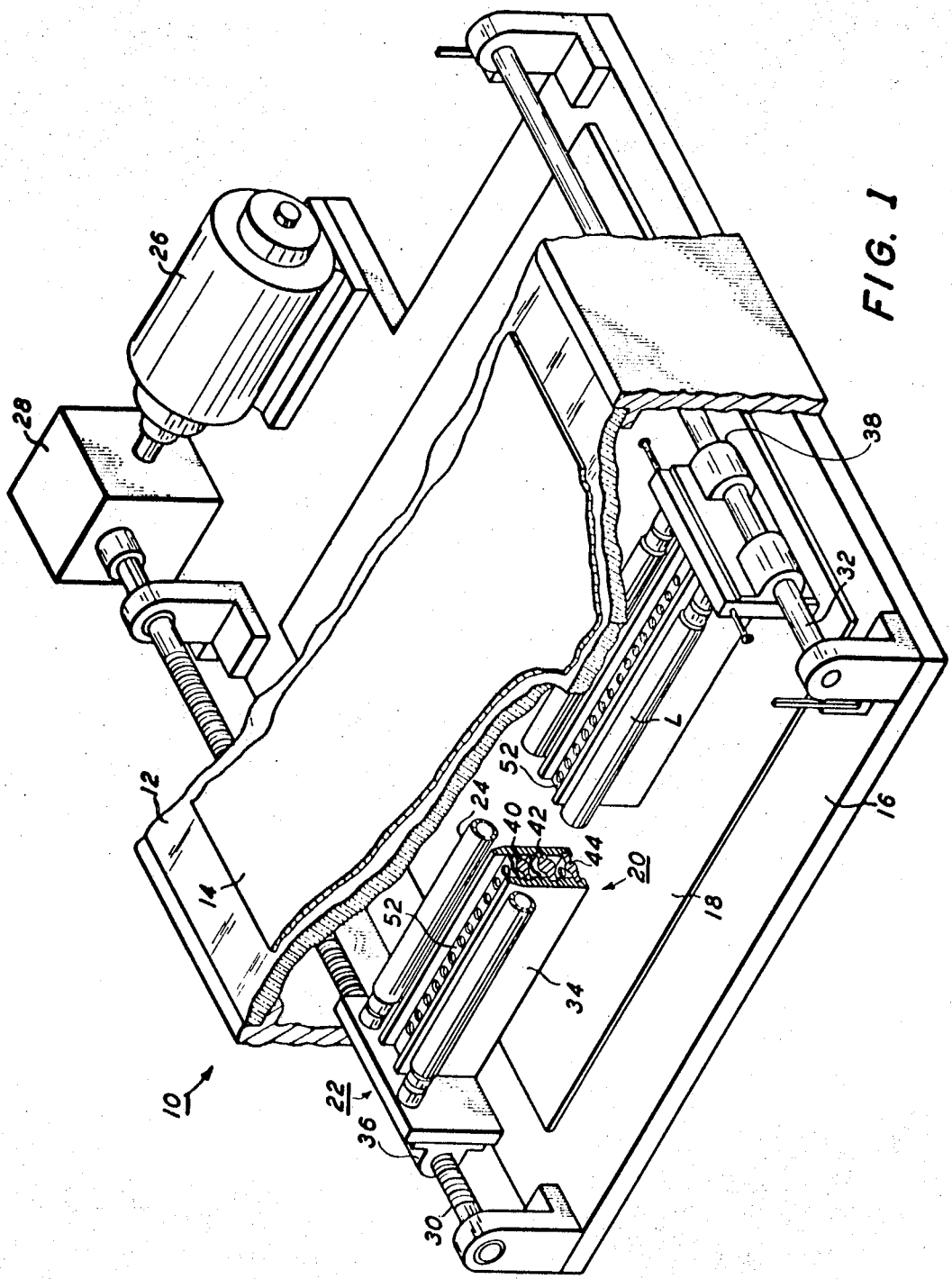

United States Patent
Agliata

[15] 3,655,284
[45] Apr. 11, 1972

[54] LONGITUDINALLY INSENSITIVE LENS STRIP IMAGING DEVICE

[72] Inventor: Thomas P. Agliata, Rochester, N.Y.
[73] Assignee: Xerox Corporation, Rochester, N.Y.
[22] Filed: Mar. 28, 1969
[21] Appl. No.: 811,556

[52] U.S. Cl. .................................. 355/18, 355/46, 355/50, 355/66, 95/15, 350/167
[51] Int. Cl. ...................................................... G03b 27/50
[58] Field of Search ........................... 355/18, 46, 50; 95/15; 350/167

[56] References Cited

UNITED STATES PATENTS 2,736,235   2/1956   Toulon ............................. 350/167 X
3,447,438   6/1969   Kaufer ............................. 95/15

Primary Examiner—John M. Horan
Attorney—Norman E. Schrader, James J. Ralabate and Michael J. Colitz, Jr.

[57] ABSTRACT

Apparatus for projecting light images from an object towards an image surface. The apparatus includes a plurality of lens strips positioned to project the image at a 1:1 magnification. The first and third lens strips are of a common focal length while the lens strip therebetween is of a focal length half that of the other lens strips. This arrangement renders the apparatus insensitive to its longitudinal position along the optical path.

2 Claims, 2 Drawing Figures

INVENTOR.
THOMAS P. AGLIATA

LONGITUDINALLY INSENSITIVE LENS STRIP IMAGING DEVICE

This invention relates to short conjugate length optical imaging devices and more particularly to lens strip optical imaging devices which are insensitive to their longitudinal location along the optical path.

Short conjugate length imaging systems as described, for example, in Canadian Patent No. 771,916 issued Nov. 21, 1967 to H. Kaufer et al. and U.S. applications Ser. Nos. 683,988 filed Nov. 17, 1967 in the name of Osmar A. Ullrich, Jr., et al., 683,837 filed Nov. 17, 1967 in the name of Robert W. Gundlach, 683,987 filed Nov. 17, 1967 in the name of Robert W. Gundlach et al. and 689,557 filed Nov. 17, 1967 in the name of R. W. Gundlach et al. According to those disclosures, a plurality of strips of transparent material are positioned across the optical path between the object and image planes. The strips are formed with lenses thereon so that the lens strip adjacent the object plane will invert and revert received light rays to form an intermediate image between the extreme lens strips. The lens strip adjacent the image plane will, in like turn, invert and revert the intermediate image to thereby project a light image toward the image plane. A light gathering means such as a lens strip functioning generally as a field lens intermediate the first mentioned lens strips may be employed to redirect the light from the first lens towards the second to increase efficiency. Each of the strips has its lens elements aligned with the lens elements of each adjacent strip so that a continuous image of the projected light pattern may be projected to form a continuous image at the image plane corresponding to the original at the object plane. When relative motion is caused between the lens strip imaging device and the object and/or light receiving surface, a continuous image of an object may be projected to the light receiving surface.

In known embodiments of lens strip imaging devices, an accurate positioning of the optical elements within the imaging device as well as an accurate positioning of the imaging device with respect to the object and image planes must be maintained. Improper positioning with the imaging system can result in improper focus, improper overlapping of image segments or other deleterious effects of the light representation of the original document on the light receiving surface.

The present invention is directed toward lens strip imaging devices which are insensitive to their longitudinal or axial positioning between the object and image planes. Such systems minimize the need for its accurate positioning within the imaging system thus resulting in decreased costs of assembly and reduced time for alignment.

It is therefore an object of the instant invention to project light patterns from an object toward a light responsive surface by apparatus which is insensitive to its positioning therebetween.

It is another object of the instant invention to eliminate alignment of lens strip optical imaging systems along their optical axes between an object and an image plane.

It is another object of the instant invention to design optical elements for lens strip optical imaging systems which render them longitudinally insensitive to their positioning along the optical path.

These and other objects of the instant invention are attained by a lens strip optical imaging device having a first lens strip positioned adjacent the object which will invert and revert received light rays to create an intermediate image. A second lens strip positioned adjacent the image plane will then invert and revert the intermediate image and project it toward a light responsive surface. A lens strip, intermediate the first mentioned strips, having lenses with a focal length half that of the lenses of the first and second lens strips and positioned therebetween will function to render the imaging device insensitive to the positioning of the device along the optical path of the system.

Figure 2:
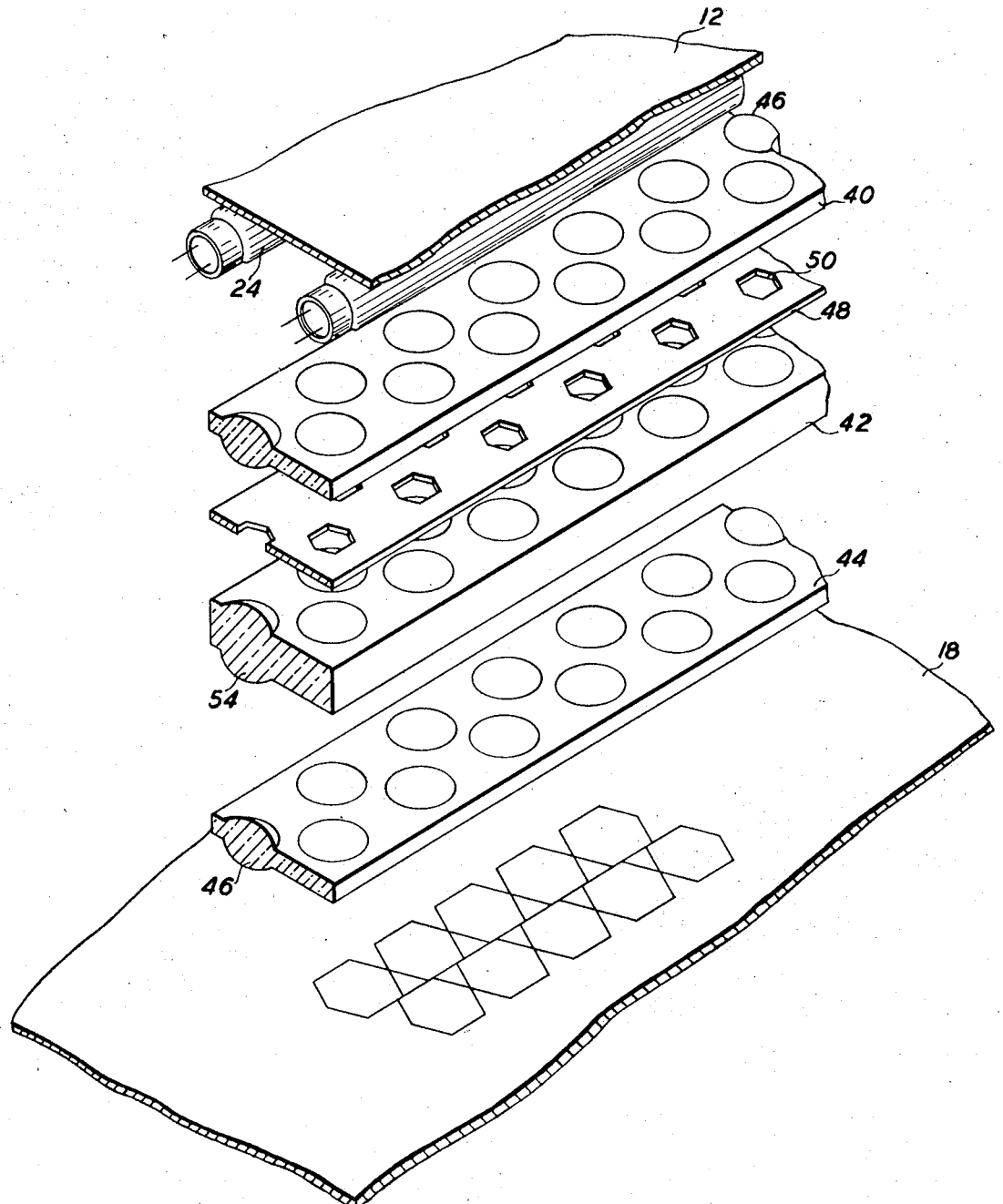

For a better understanding of the invention as well as other objects and advantages thereof, reference is had to the following description of one embodiment of the invention to be read in conjunction with the accompanying drawings wherein;

FIG. 1 is a perspective illustration of an optical imaging system utilizing the instant invention with parts broken away to show the internal constructions thereof and FIG. 2 is a perspective illustration of the imaging elements shown in FIG. 1 in association with the object and image planes.

Referring now to the Figs. there is shown an imaging system constructed in accordance with the present invention. The imaging system is adapted to project light rays from an object plane to a light responsive member at the image plane to create a useable pattern thereon.

The machine 10 includes a transparent platen 12 for supporting an object 14 placed face down thereon. The base plate 16 supports a photosensitive or light responsive member 18 which serves as the image surface for the optical system. The optical system is generally referred to as 20 and has the object 14 at its object plane in the photosensitive or light responsive member 18 at its image plane. On the movable carriage 22, which supports the optical imaging system 20, are secured lamps 24, the lens system and their housings. The drive system shown includes a reversible constant speed motor 26 and a gear box 28 for driving the carriage 22 across the opposing faces of the document and the light responsive member.

The carriage 22 may be mounted on any suitable means such as a drive screw 30 and a bearing rod 32 arranged with their axes in parallel and spaced relationship on either end of the support base plate 16. When the motor 26 is activated through the gear box 28 it turns the drive screw 30 which in turn drives the scanning optical imaging system 20 and the illumination lamps 24 in either direction between the platen 12 and the light responsive member 18. The scanning optical imaging system moves at a constant velocity and is capable of reversing its direction at the end of its travel with the lamps inactivated.

The optical imaging system comprises a housing 34 supported at one end by a block 36 which threadedly receives the drive screw 30 and at its other end by a block 38 which slidably receives the bearing rod 32. The lamps are physically arranged to be parallel with respect to each other and are spaced on either side of the housing 34 adjacent the side of the platen 12. The lamps thus illuminate the object 14 placed on the platen thereby projecting light rays from the object to pass through the optical imaging system to be imaged on the photosensitive member 18. The photosensitive member 18 may be a uniformly charged photoconductor which, after exposure, provides a useful developable latent electrostatic image. Alternatively, the photosensitive member could be a photographic film. The overall configuration of the machine is shown for illustrative purposes and is not considered a limiting feature on the invention herein.

Three lens strips 40, 42 and 44 are arranged along the length of the housing 34 and each is in superimposed relationship relative to the others. The uppermost lens strip 40 is formed as is illustrated, with a row of lens elements 46. The lenses along each strip may be made of glass, plastic or other transparent material and are an integral part of the material forming other portions of the strip. The strip 44 is preferably the same as the strip 40 in lens design and power and is arranged relative thereto in such a manner that a lens element 46 of each of the strips is coaxial along the optical path with the lens element of the other strips to form a single imaging device. A single imaging device is comprised of three lenses 46 in the three strips 40, 42 and 44 respectively. It is preferable to construct each lens strip with two staggered rows of lens elements, as shown, so that the lenses of each row complement the lens elements of the adjacent row by imaging the areas of the document between the lenses. Also part of the imaging system is an opaque plate 48 having apertures 50 to define aperture stops is of the lenses nearest the platen 12. Also, opaque plate 52 having apertures to define aperture stops is held in housing 34 to define field stop means.

The lens strips 40 and 44 which function to invert and revert light images are constructed with their lens elements 46 to have the same focal lengths. The lens elements 54 of the intermediate or field lens 42 are constructed to have focal lengths each equal to half the focal length of the other lens strips. In such a system, the total conjugate length between the object plane and image plane would be eight focal lengths of the lenses of strips 40 or 44. The distance between the field lens and each adjacent which would be two focal lengths of a lens of strip 40 or 44 with the field lens positioned halfway between strips 40 and 42.

A proof for the longitudinal insensitivity of such an imaging device can be seen by setting $fa=2fb=fc$ wherein $fa$, $fb$ and $fc$ are the focal lengths of lens $a$, $b$ and $c$ (40, 42 and 44) respectively; and by setting $tab = tbc = 2fa$ wherein tab is the distance between lenses $a$ and $b$ (40 and 42) and $tbc$ is the distance between lenses $b$ and $c$ (42 and 44).

Now using the Newtonian relation of $1/S + 1/S' = 1/f$ where $S$, $S'$ and $f$ are the object distance, image distance, and focal length of any given lens:

(1) $$S'a = \frac{fa Sa}{Sa - fa}$$

(2) $$Sb = 2fa - S'a$$

$$\therefore S'b = \frac{fa Sa - 2fa^2}{Sa - 3fa}$$

(3) $$Sc = 2fa - S'b$$

$$\therefore S'c = -Sa + 4fa$$

Then $Sa + 4fa + S'c = Sa + 4fa - Sa + 4fa = 8fa = TC$, the total conjugate length.

Since the total conjugate length is independent of $Sa$, the distance between the object and the first lens, the image location remains fixed for a given object location independent of the longitudinal location of the lens strip between the two.

It is thus seen that this longitudinal insensitivity holds true in a system where the focal length of the lenses of the extreme lens strips are equal and each respectively twice the focal length of the lenses of the intermediate strip 42 and wherein the total conjugate distance is eight times the focal length of the lenses of either the first or third strips.

With such a configuration of the imaging system, the intermediate image will be formed at a 1:1 magnification at the field lens 42 when the lens strips are symmetrically centered with the lens strip 40 two focal lengths away from the object plane and the lens strip 44 two focal lengths away from the image plane. If the imaging system is moved as a unit toward the image, the intermediate image will be formed on the object side of the field lens but at a reduced magnification. This, however, as shown above, will not prohibit the intermediate image from being projected to the image plane in a 1:1 configuration, upright and wrong-reading, with respect to the original object. If, however, the imaging system is moved as a unit toward the object plane, the intermediate image will be formed as a reduced image on the image side of the field lens but will, like the immediately above discussed configuration, create a 1:1 image on the image plane, as compared with the original image.

While the instant invention as described as being carried out in a specific embodiment hereof, it is not intended to be limited thereby but it is intended to cover the invention broadly within the scope of the appended claims.

What is claimed is:

1. A short focal length imaging device for projecting light rays from an object plane to an image plane at a 1:1 magnification including
    first transparent strip means having lens portions formed thereon optically positioned between the object and the image planes,
    second transparent strip means having lens portions formed thereon optically positioned between the object plane and said first strip means being adapted to invert and revert light rays received from the object plane and form an intermediate image thereof,
    third transparent strip means having lens portions formed thereon optically positioned between said first strip means and said image plane being adapted to invert and revert light rays of the intermediate image and to project an image thereof to said image plane, the lens portions of said second and third strip means being of equal focal length and said first strip means having its lens portion of a focal length half the focal length of the lens portions of said second and third strip means whereby the imaging device is insensitive to positioning between the object plane and image plane.

2. The apparatus as set forth in claim 1 wherein the distance between the object plane and image plane is eight times the focal length of the second and third strip means.

* * * * *